United States Patent
Miyamoto et al.

(10) Patent No.: US 12,296,758 B2
(45) Date of Patent: May 13, 2025

(54) VEHICLE INTERIOR MATERIALS AND THEIR MANUFACTURING METHODS THEREFOR

(71) Applicants: HONDA MOTOR CO., LTD., Tokyo (JP); OKAMOTO INDUSTRIES, INC., Tokyo (JP)

(72) Inventors: Hajime Miyamoto, Tokyo (JP); Masahiko Nakayama, Tokyo (JP); Shoichiro Negishi, Tokyo (JP); Yasuki Kamo, Tokyo (JP); Fumihiko Inoue, Shizuoka (JP)

(73) Assignee: Okamoto Industries, Inc., Tokyo (JP)

(*) Notice: Subject to any disclaimer, the term of this patent is extended or adjusted under 35 U.S.C. 154(b) by 0 days.

(21) Appl. No.: 17/493,013

(22) Filed: Oct. 4, 2021

(65) Prior Publication Data
US 2022/0105880 A1 Apr. 7, 2022

(30) Foreign Application Priority Data
Oct. 7, 2020 (JP) .................. 2020-169706

(51) Int. Cl.
*B60R 13/02* (2006.01)
*B32B 3/02* (2006.01)
(Continued)

(52) U.S. Cl.
CPC .............. *B60R 13/02* (2013.01); *B32B 3/02* (2013.01); *B32B 5/18* (2013.01); *B32B 7/05* (2019.01);
(Continued)

(58) Field of Classification Search
CPC .......... B32B 5/18; B32B 7/05; B32B 27/065; B32B 2255/10; B32B 2305/022;
(Continued)

(56) References Cited

U.S. PATENT DOCUMENTS 6,368,445 B2 * 4/2002 Rost .................... B29C 48/0014
156/244.11
6,633,019 B1 * 10/2003 Gray ................... B60R 21/2165
219/121.72
(Continued)

FOREIGN PATENT DOCUMENTS

CN 1606511 A 4/2005
CN 105459713 A 4/2016
(Continued)

OTHER PUBLICATIONS

Machine translation of WO 2021/060931 via EPO (Year: 2021).*
(Continued)

*Primary Examiner* — Laura C Powers
*Assistant Examiner* — Rebecca L Grusby
(74) *Attorney, Agent, or Firm* — Millen, White, Zelano & Branigan P.C.; William F. Nixon

(57) ABSTRACT

Interior material for vehicle including a foamed sheet layer having a foam surface opposing a first rear surface of the first sheet layer, a first sheet layer joined along the foam surface, and a second sheet layer joined to a part of a first surface of the first sheet layer, bonded together while a surface boundary of the first sheet layer and the second sheet layer is kept linear, in which a first surface of the first sheet layer has a joined portion having a width dimension substantially the same as that of the second sheet layer and formed linearly, and a surface treated layer formed excluding the joined portion, and the second sheet layer joined along the joined portion and bonded together by a pressing force with a second surface of the second sheet layer and a foam rear surface of the foamed sheet layer as pressure receiving surfaces.

4 Claims, 3 Drawing Sheets

(51) Int. Cl.
  *B32B 5/18* (2006.01)
  *B32B 7/05* (2019.01)
  *B32B 27/06* (2006.01)
  *B32B 37/10* (2006.01)
  *B32B 37/18* (2006.01)

(52) U.S. Cl.
  CPC ............ *B32B 27/065* (2013.01); *B32B 37/10* (2013.01); *B32B 37/18* (2013.01); *B32B 2305/022* (2013.01); *B32B 2307/402* (2013.01); *B32B 2605/003* (2013.01)

(58) Field of Classification Search
  CPC ........ B32B 2307/402; B32B 2307/404; B32B 2605/003; B32B 3/14; B32B 37/18; B32B 3/02; B32B 3/08; B32B 3/085; B32B 3/16; B32B 2307/51; B60R 13/02; B60R 13/0212; B60R 13/0237; B60R 13/0243; B60R 13/025; B60R 13/0256; B60R 13/0252; B60R 2013/0281; B60R 21/2165; B29C 48/21; B29C 66/305; B29C 66/43; B29C 66/723; B29C 66/727; B29C 66/73322; B29K 2995/0021
  USPC ........................................................ 428/213
  See application file for complete search history.

(56) References Cited

U.S. PATENT DOCUMENTS

| | | | | |
|---|---|---|---|---|
| 6,670,012 | B2 * | 12/2003 | Campbell | B29C 66/43 428/319.3 |
| 10,518,505 | B2 | 12/2019 | Graesser | |
| 2002/0011302 | A1 | 1/2002 | Rost et al. | |
| 2002/0187309 | A1 * | 12/2002 | Rost | B29C 44/24 428/172 |
| 2008/0199679 | A1 * | 8/2008 | Rost | B32B 27/304 156/60 |
| 2009/0304973 | A1 * | 12/2009 | Buhring | B32B 5/18 428/43 |
| 2012/0276348 | A1 * | 11/2012 | Clausi | B32B 29/002 428/524 |
| 2016/0089850 | A1 | 3/2016 | Hamada et al. | |
| 2023/0083165 | A1 * | 3/2023 | Li | B32B 27/20 |

FOREIGN PATENT DOCUMENTS

| | | | |
|---|---|---|---|
| CN | 106256543 A | 12/2016 | |
| DE | 202007017218 U1 * | 1/2009 | |
| JP | S5744520 A | 3/1982 | |
| JP | 59-172619 U | 11/1984 | |
| JP | H037208 Y2 * | 2/1991 | |
| JP | H08-323899 A | 12/1996 | |
| JP | H11192896 A | 7/1999 | |
| JP | 2007-261259 A | 10/2007 | |
| JP | 2008-110647 A | 5/2008 | |
| WO | WO-2021060931 A1 * | 4/2021 | B27D 5/00 |

OTHER PUBLICATIONS

Machine translation of DE 202007017218 via EPO (Year: 2001).*
Machine translation of Jp H037208 via IP.com (Year: 1991).*
English Abstract Provided for JPH08323899, Publication Date: Dec. 10, 1996.
English Abstract Provided for JP2008110647, Publication Date: May 15, 2008.
Office Action for corresponding Chinese patent application No. 202111170327.X issued on Jul. 11, 2023 (pp. 1-7) and english translation thereof (pp. 1-7).
Office Action in corresponding Japanese patent application No. 2020-169706 dispatched on Jul. 4, 2023 (pp. 1-3) and English machine translation thereof (pp. 1-3).
Office Action in corresponding China application No. 202111170327.X dated May 1, 2024 (pp. 1-8) and English translation thereof (pp. 1-7).
Office Action in corresponding Japanese Patent Application No. 2020-169706 dated Nov. 28, 2023 (pp. 1-3) and English translation thereof (pp. 1-2).
The 4th Office Action for corresponding Chinese patent application No. 202111170327.X issued on Feb. 20, 2025 (pp. 1-5) and English Translation thereof (pp. 1-7).
Office Action for corresponding Chinese patent application No. 202111170327.X issued on Oct. 3, 2024 (pp. 1-7) and English Translation thereof (pp. 1-7).

* cited by examiner

VEHICLE INTERIOR MATERIALS AND THEIR MANUFACTURING METHODS THEREFOR

BACKGROUND OF THE INVENTION

1. Field of the Invention

The present invention relates to an interior material for vehicle and a manufacturing method for manufacturing an interior material for vehicle such as an instrument panel (dashboard) on which an airbag is mounted, a pillar, a roof rail and the like in a periphery of a door glass in a vehicle such as an automobile.

In detail, the present invention relates to an interior material for vehicle, made of a plurality of types of sheet layers in different colors, and a method for manufacturing the same.

2. Description of the Related Art

Conventionally, a stacked sheet for skin material in which a plurality of types of sheets in different colors are stacked so that the plurality of types of sheets are exposed on at least one of surfaces, and the surfaces of the exposed plurality of types of sheets are formed substantially on the same plane is known as an interior material for an automobile such as an instrument panel (see PTL1: Japanese Patent Application Publication No. H08-323899, for example).

In the stacked sheet for skin material, a plurality of types (two types) of sheets formed of a thermoplastic polymer material such as an olefinic thermoplastic elastomer (TPO) and the like are stacked so that both sheet surfaces can be seen from either one of the surfaces. In the case of the two types of sheets, after either one of the sheets is calender-molded and taken up in a roll state, the other sheet is calender-molded, and end portions of the both sheets are aligned and stacked still in a softened state. After that, this stacked sheet is passed between a hard roll and a soft roll so that the surface on which the both sheets are exposed is located on the hard roll side and pressed and molded such that the surfaces of the both sheets form a substantially same plane. The surface of the smoothened stacked sheet is subjected to treatment such as coating with a surface treatment agent, and a desired pattern is embossed/formed on the surface by an emboss roll. Finally, when the stacked sheet is to be used as the skin material such as a door trim of an automobile or the like, a plastic foam is stacked on a rear surface of the stacked sheet by adhesion or the like.

Moreover, as an interior material for vehicle forming a surface decorative layer of an instrument panel with a lid for airbag, such an interior material for vehicle is known that is formed of an elastic foamed sheet layer made of a foamed synthetic resin, a lower sheet layer made of a thermoplastic synthetic resin stacked on the elastic foamed sheet layer, and an upper sheet layer made of a thermoplastic synthetic resin stacked on the lower sheet layer, and a fragile part for lid cleavage is formed having a perforated state by laser irradiation from the elastic foamed sheet layer side (See PTL 2: Japanese Patent Application Publication No. 2008-110647, for example).

In the formation of the fragile part for lid cleavage by laser irradiation, a laser beam emitted from a rear surface side of the instrument panel to a surface is controlled by detecting the laser beam by a sensor disposed on the surface side of the instrument panel.

CITATION LIST

Patent Literature

[PTL 1] Japanese Patent Application Publication No. H08-323899

[PTL 2] Japanese Patent Application Publication No. 2008-110647

SUMMARY OF THE INVENTION

In PTL1, the stacked sheet in which the other (upper) sheet is stacked only on a part of the one (lower) sheet is molded so that the surfaces of the both sheets form substantially the same plane by pushing in the upper sheet toward a part of the lower sheet by pressing in a stacking direction by the hard roll and the soft roll.

However, when the stacked sheet is passed between the rolls, the upper sheet protrudes more than the lower sheet toward the hard roll (see FIG. 4 of PTL1). Thus, the pressing (inter-roll pressure) can easily concentrate only on the upper sheet, and there is a possibility not only that the stacked part of the lower sheet is pushed in toward the soft roll, but that the upper sheet is compressed in the stacking direction and is expanded/deformed in a width direction crossing the stacking direction.

By the way, even though the upper sheet and the lower sheet are calender-molded, it is difficult to make a thickness of them strictly uniform in entirety, and there are some parts with different thicknesses. The partial difference in the thickness is increased with stacking of the upper sheet on the lower sheet. Therefore, the partially thick part is compressed more in the stacking direction than a partially thin part by the pressing (inter-roll pressure) while passing between the rolls.

As a result, the upper sheet is partially expanded/deformed in the width direction by a change factor during the passage between the rolls as above, and a surface boundary portion of the plurality of types of sheets in different colors is partially bent easily by the pressing (inter-roll pressure) in the stacking direction and can be hardly made linear, which was a problem.

Moreover, in PTL1, since the surface boundary portion has no steps between the plurality of types of sheets in different colors but is substantially the same plane, even if the sensor disposed on the surface side of the plurality of types of sheets performs detection, there is no target (mark) and thus, position control could not be executed accurately for the surfaces of the plurality of types of sheets.

That is, even if a fragile part for lid cleavage of an airbag is to be formed from the rear surface of the stacked sheet by the laser irradiation at a desired position on the surface of the stacked sheet made of the plurality of types of sheets in different colors, accurate positioning cannot be conducted, and the fragile part for lid cleavage cannot be precisely worked, which was a problem.

In order to solve such problems, an interior material for vehicle according to the present invention is an interior material for vehicle in which a first sheet layer and a second sheet layer in different colors are stacked on a surface side of a foamed sheet layer and bonded together by a pressing force in a stacking direction, including the foamed sheet layer having a foam surface opposing a first rear surface of the first sheet layer, the first sheet layer joined along the foam surface, and the second sheet layer joined to a part of a first surface of the first sheet layer, in which the first surface of the first sheet layer has a joined portion having a width dimension substantially the same as that of the second sheet layer and formed linearly and a surface treated layer formed excluding the joined portion, the second sheet layer is joined along the joined portion and bonded together by the pressing force with a second surface of the second sheet layer and a foam rear surface of the foamed sheet layer as pressure receiving surfaces.

Moreover, in order to solve such problems, a manufacturing method for manufacturing an interior material for vehicle according to the present invention is a method for manufacturing an interior material for vehicle, in which a first sheet layer and a second sheet layer in different colors are stacked on a surface side of a foamed sheet layer and bonded together by a pressing force in a stacking direction, including a surface treating process of forming a surface treated layer on a first surface of the first sheet layer, excluding a joined portion which has substantially the same width dimension as that of the second sheet layer and is linear, a first stacking process of joining the second sheet layer along the joined portion of the first surface, a second stacking process of joining a foam surface of the foamed sheet layer to a first rear surface of the first sheet layer, and a bonding process of bonding the second sheet layer, the first sheet layer, and the foamed sheet layer together by the pressing force with a second surface of the second sheet layer and a foam rear surface of the foamed sheet layer as pressure receiving surfaces.

BRIEF DESCRIPTION OF THE DRAWINGS

FIGS. 3A to 3D are explanatory views illustrating entire configuration of a method for manufacturing an interior material for vehicle according to an embodiment of the present invention, in which FIG. 3A is a vertical reduced front view of a surface treating process, FIG. 3B is a vertical reduced front view of a first stacking process, FIG. 3C is a vertical reduced front view of a second stacking process and a bonding process, and FIG. 3D is a vertical reduced front view of a base-material stacking process.

DESCRIPTION OF THE PREFERRED EMBODIMENTS

Figure 1:
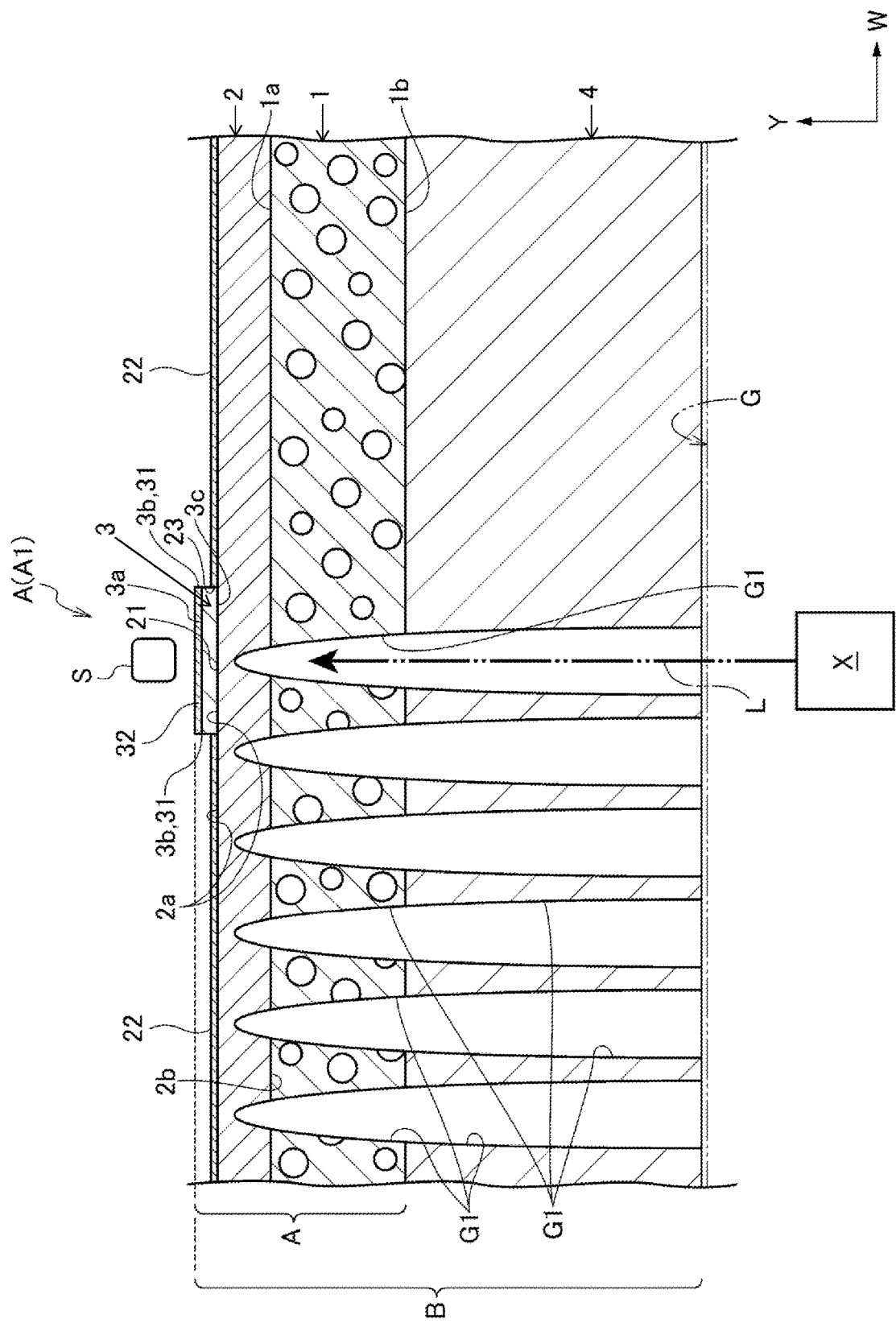
FIG. 1 is an explanatory view illustrating entire configuration of an interior material for vehicle according to an embodiment of the present invention and partial vertical front view during manufacture (laser machining process)

Hereinafter, an embodiment of the present invention will be described in detail on the basis of the drawings.

An interior material for vehicle A according to an embodiment of the present invention is, as illustrated in FIGS. 1, 2, 3A to 3D, used for forming a surface decorative layer B such as an instrument panel (dash board) on which an airbag G is mounted, a pillar, a roof rail and the like in a periphery of a door glass in a vehicle such as an automobile.

The surface decorative layer B is constituted by the interior material for vehicle A in which a first sheet layer 2 and a second sheet layer 3 in different colors are stacked on a surface side of a foamed sheet layer 1 and a base material 4 made of a hard synthetic resin and mounted on a rear surface side of the foamed sheet layer 1.

Appearances of the first sheet layer 2 and the second sheet layer 3 on a surface side of the surface decorative layer B are formed in two colors or three colors or more in different systems or dark and light two colors or three colors or more in the same system aligned.

In more detail, the interior material for vehicle A according to the embodiment of the present invention includes the foamed sheet layer 1, the first sheet layer 2 joined along a foam surface 1a of the foamed sheet layer 1, and the second sheet layer 3 joined along a first surface 2a of the first sheet layer 2 as major constituent elements.

It is to be noted that a direction in which the foamed sheet layer 1, the first sheet layer 2, and the second sheet layer 3 are stacked is referred to as a "stacking direction Y" in the following. A direction along each layer crossing the stacking direction Y is referred to as a "width direction W" in the following.

The foamed sheet layer 1 is formed having a flat plate shape with a predetermined thickness by polypropylene foam (PPF) or a foam material similar to that. The first sheet layer 2 is an underlayer formed having a flat plate shape by a thermoplastic polyolefinic resin (TPO) or an elastically deformable material similar to that.

When used for the surface decorative layer B of the instrument panel or the like, a thickness of the first sheet layer 2 is preferably set to approximately 0.50 mm to 1.00 mm or in more detail, to 0.65 mm to 0.75 mm.

Moreover, the first surface 2a of the first sheet layer 2 has a joined portion 21 formed by opposing a second rear surface 3c of the second sheet layer 3 which will be described later and a surface treated layer 22 formed excluding the joined portion 21.

The joined portion 21 is formed having substantially the same width dimension as the width dimension of the second sheet layer 3 which will be described later and linearly.

The surface treated layer 22 is stacked over the entire first surface 2a excluding the joined portion 21, and a stepped layer wall 23 is formed between the surface treated layer 22 and the joined portion 21.

As the surface treated layer 22, luster adjustment treatment using a delustering agent or a lustering agent, treatment for creating a protective film on a surface and the like can be cited. As a method for forming the surface treated layer 22, printing or coating of a surface treatment agent can be cited, and gravure printing or printing using a printing machine such as an inkjet printer or coating by using spray coat by a spray gun or the like is preferable.

The second sheet layer 3 is an upper layer formed of an elastically deformable material such as TPO similarly to the first sheet layer 2 and is formed having a band shape with a thickness smaller than that of the first sheet layer 2 and with a small width dimension.

When used for the surface decorative layer B of an instrument panel or the like, the thickness of the second sheet layer 3 is preferably set to approximately 0.10 mm to 0.50 mm or in more detail, to 0.20 mm to 0.30 mm.

Moreover, the second sheet layer 3 is disposed linearly along a part of the first surface 2a of the first sheet layer 2, and a second surface 3a of the second sheet layer 3 is disposed so as to protrude more than the first surface 2a toward a sensor for position control S for working, which will be described later. At a corner portion from a side surface 3b of the second sheet layer 3 to the first surface 2a and the surface treated layer 22, a stepped part 31 is formed.

Furthermore, it is preferable that a surface treated layer 32 for luster adjustment treatment and creating a protective film is formed on the second surface 3a of the second sheet layer 3 similarly to the first surface 2a of the first sheet layer 2. The surface treated layer 32 of the second sheet layer 3 is formed over the entire second sheet layer 3, unlike the surface treated layer 22 of the first sheet layer 2.

Though not shown, it is possible to form the surface treated layer 32 on the side surface 3b of the second sheet layer 3.

The first sheet layer 2 and the second sheet layer 3 are different from each other at least in colors, and it is set such that, in a state where the first sheet layer 2 and the second sheet layer 3 are stacked, the appearance has two colors or three colors or more.

At least a color of the first surface 2a in the first sheet layer 2 is preferably set to a dark color system such as black with low laser-beam permeability (high laser-beam absorptivity) by containing carbon black or the like, for example.

At least a color of the second surface 3a in the second sheet layer 3 is preferably set to a color with low laser-beam permeability such as brown, different from that of the first sheet layer 2, or a light color system with high laser-beam permeability (low laser-beam absorptivity) such as gray, red, orange, yellow and the like. Moreover, as the second sheet layer 3, not only the first sheet layer 2 but also a plurality of types of second sheet layers 3', 3" in colors different from each other can be disposed side by side.

In the case of illustration in FIGS. 1 and 3A to 3D as examples of the colors, the appearances of the first sheet layer 2 and the second sheet layer 3 are set to two colors. In the illustrated examples, the first sheet layer 2 is set to a dark color in the black system, while the second sheet layer 3 to a light color.

Figure 2:
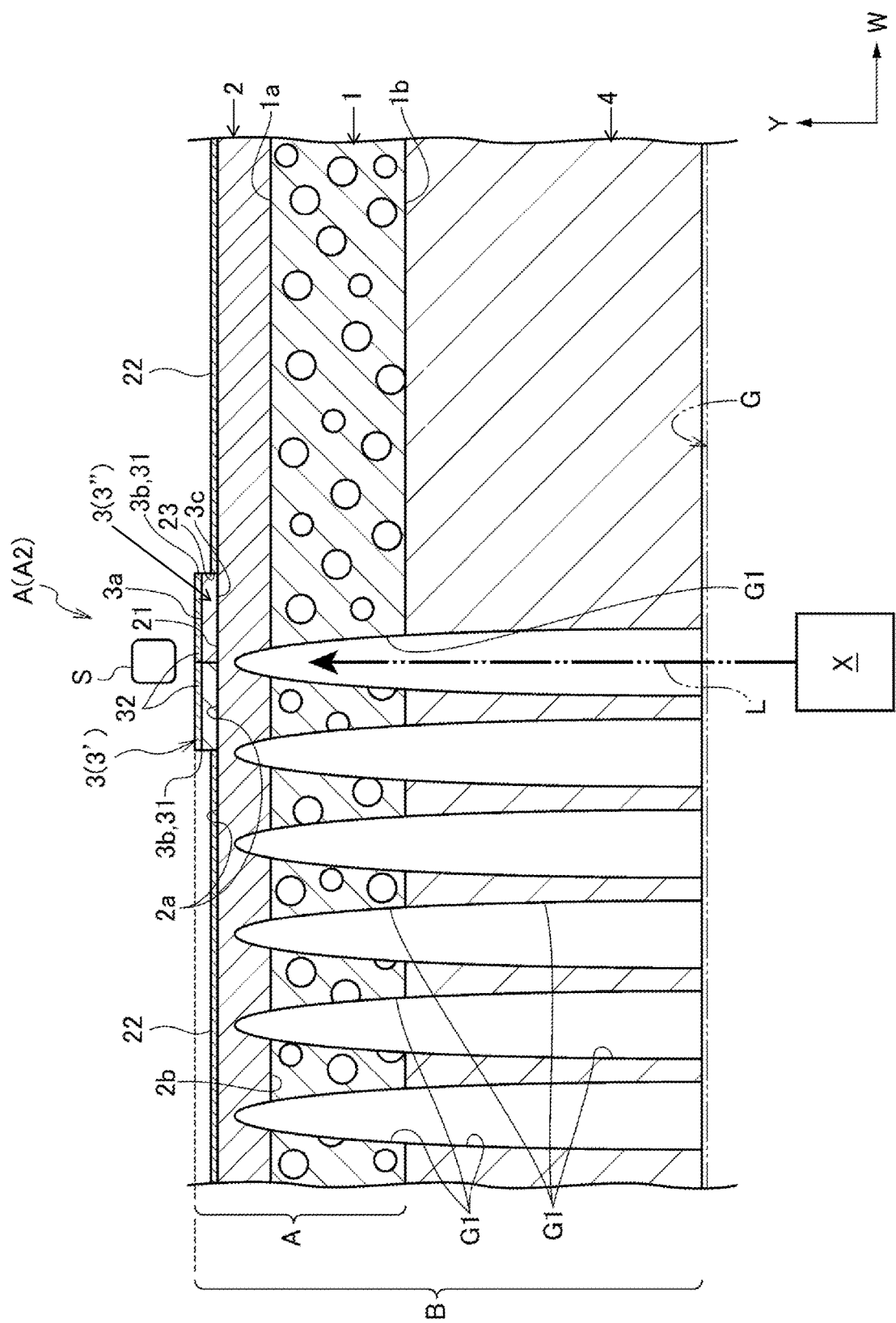
FIG. 2 is an explanatory view illustrating a variation of the interior material for vehicle according to the embodiment of the present invention and partial vertical front view during manufacture (laser machining process)

In the case of illustration in FIG. 2 as another example of the colors, the appearances of the first sheet layer 2 and the second sheet layer 3 are set to three colors. In the illustrated example, two types of the second sheet layers 3' and 3" in different colors are disposed side by side as the second sheet layer 3.

It is to be noted that, though not shown as a variation of colors other than them, such a change to four colors or more can be made.

Moreover, in addition to that, patterns or the like of the appearance can be set different in a stacked state of the first sheet layer 2 and the second sheet layer 3.

By the way, the airbag G mounted on a vehicle is disposed in an accommodated state in which it is folded to a rear surface side of the surface decorative layer B and has such a structure that it tears off a lid for airbag (not shown) and is expanded/deployed at emergency. On the rear surface side of the surface decorative layer B, a fragile part for lid cleavage G1 of the airbag G is formed by working from the base material 4 side formed of a hard synthetic resin such as polypropylene stacked on the rear surface side of the foamed sheet layer 1.

In the fragile part for lid cleavage G1 of the airbag G, it is preferable that the lid for airbag having a square frame shape or the like is formed by operation control of a working machine by the sensor for position control S disposed by opposing the second sheet layer 3, which is on a surface side of the surface decorative layer B.

As a working method of the fragile part for lid cleavage G1, laser-beam irradiation, a knife such as a cutter, injection of a high-pressure water or the like, and partial cutting by the working machine using a method similar to them can be cited.

As an example of the working machine, in the case of laser irradiation, a pulse-state laser beam L emitted from a laser source X is detected by the sensor for position control S for working, and an irradiation position from the laser source X and irradiation time are adjusted on the basis of the stepped part 31 generated between the first sheet layer 2 (first surface 2a and surface treated layer 22) and the second sheet layer 3 (second surface 3a) so that the lid for airbag is drilled in a perforated state with a predetermined depth.

A method for producing the interior material for vehicle A according to the embodiment of the present invention includes a bonding process of the foamed sheet layer 1, the first sheet layer 2, and the second sheet layer 3. Moreover, when the fragile part for lid cleavage G1 of the airbag G is to be formed, a process of working a lid for airbag by the working machine is included.

The bonding process includes a surface treating process of forming the joined portion 21 and the surface treated layer 22 on the first sheet layer 2, a first stacking process of joining the second sheet layer 3 along the joined portion 21, a second stacking process of joining the foamed sheet layer 1 to the first sheet layer 2, and a bonding process of bonding the second sheet layer 3, the first surface 2a, and the foamed sheet layer 1 together as major processes.

In addition to that, a base-material stacking process in which the base material 4 is stacked on the foamed sheet layer 1 is preferably included.

Figure 3:
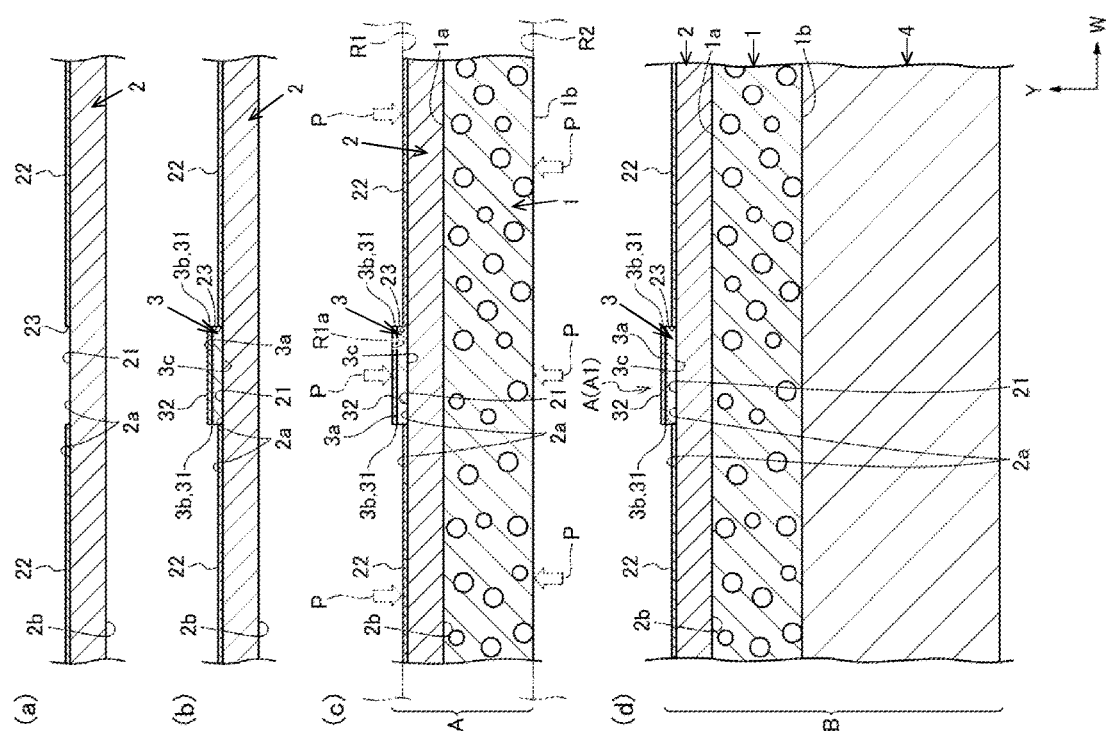

In the surface treating process, as illustrated in FIG. 3A, first, the first sheet layer 2 formed having a large width is fed out by a calender (not shown) or the like. In the illustrated example, the black first sheet layer 2 with a thickness of 0.70 mm is used, and the surface treated layer 22 is formed by a printing machine (not shown) or the like on the first surface 2a of the first sheet layer 2, excluding the joined portion 21 opposing the second sheet layer 3.

In the subsequent first stacking process, as illustrated in FIG. 3B, the second sheet layer 3 cut by a slit machine (not shown) or the like into a narrow band shape of a predetermined dimension is joined (overlapped) along the joined portion 21, which is a part of the first surface 2a of the first sheet layer 2. In the illustrated example, the gray second sheet layer 3 having a thickness of 0.25 mm is used, and the surface treated layer 32 is formed at least on the second surface 3a of the second sheet layer 3.

In the subsequent second stacking process, as illustrated in FIG. 3C, the foam surface 1a of the foamed sheet layer 1 is joined (overlapped) to the first rear surface 2b of the first sheet layer 2.

In the bonding process continuing to that, the second sheet layer 3, the first sheet layer 2, and the foamed sheet layer 1 of a joined three-layered structure still in a stacked state are bonded together by an embossing machine or the like by a pressing force P in a stacking direction Y with the second surface 3a of the second sheet layer 3 and a foam rear surface 1b of the foamed sheet layer 1 as pressure receiving surfaces so as to have the interior material for vehicle A.

As a specific example of the pressing force P in the stacking direction Y, in the case of the illustrated example, the second sheet layer 3, the first sheet layer 2, and the foamed sheet layer 1 of the three-layered structure are passed between a pair of pressurizing rolls R1 and R2. As a result, the entire second surface 3a, the first surface 2a (surface treated layer 22) of the first sheet layer 2, and the entire foam rear surface 1b are constituted to form the pressure receiving surfaces so that a substantially uniform inter-roll pressure acts.

As the first pressurizing roll R1 opposing the second surface 3a and the first surface 2a (surface treated layer 22), a hard roll having a recess part R1a fitted with the second sheet layer 3 protruding from the first surface 2a of the first sheet layer 2 or a soft roll or the like is used. On a pressing surface of the first pressurizing roll R1, a die (not shown) for applying a predetermined irregular pattern such as an emboss pattern to the second surface 3a and the first surface 2a (surface treated layer 22) is formed.

In the subsequent base-material stacking process, as illustrated in FIG. 3D, an adhesive such as a pre-coat material or the like is applied to the foam rear surface 1b of the foamed sheet layer 1 by a coater machine (not shown) or the like, and the base material 4 is bonded and stacked so as to have the surface decorative layer B. Finally, the integrated surface decorative layer B is cut into a predetermined shape by a cutting machine (not shown) such as a cutter.

After that, if a working process of a lid for airbag by a working machine is included, the fragile part for lid cleavage G1 with a predetermined depth is drilled by laser irradiation, the cutter or the like in the rear surface side of the surface decorative layer B from the base material 4 side by the sensor for position control S for working on the basis of the stepped part 31 generated between the first sheet layer 2 (the first surface 2a and the surface treated layer 22) and the second sheet layer 3 (second surface 3a). In examples illustrated in FIGS. 1 and 2 as the working process by the working machine, the above-described case of the laser irradiation is shown.

Moreover, though not shown as another example, the fragile part for lid cleavage G1 with a predetermined depth can be drilled in the rear surface side of the surface decorative layer B from the base material 4 side by the working machine such as a cutter or the like instead of the laser irradiation.

According to the interior material for vehicle A and the manufacturing method thereof according to the embodiment of the present invention as above, the second sheet layer 3 is joined along the linear joined portion 21, excluding the surface treated layer 22, on the first surface 2a of the first sheet layer 2, while the foam surface 1a of the foamed sheet layer 1 is joined to the first rear surface 2b of the first sheet layer 2, and they are stacked in three layers. This stacked body is sandwiched from both sides of the second surface 3a and the foam rear surface 1b by the pressing force (inter-roll pressure) P in the stacking direction Y.

As a result, the foamed sheet layer 1 is compressed/deformed in the stacking direction Y prior to the second sheet layer 3, and the pressing force P only to the second sheet layer 3 is alleviated. Even if the second sheet layer 3 is compressed in the stacking direction Y by the pressing force P in the stacking direction Y, the side surface 3b of the second sheet layer 3 abuts against the layer wall 23 of the surface treated layer 22 and thus, expansion/deformation of the second sheet layer 3 in the width direction W is suppressed.

Moreover, in a bonded state of the second sheet layer 3 with respect to the first surface 2a, the second sheet layer 3 (rear surface 3c) and the joined portion 21 are bonded without sandwiching the surface treated layer 22. Therefore, the first sheet layer 2 and the second sheet layer 3 can be bonded together without being affected by a material of the surface treated layer 22.

Therefore, the first sheet layer 2 and the second sheet layer 3 can be reliably bonded together while the surface boundary portion of the first sheet layer 2 and the second sheet layer 3 is kept linear.

As a result, as compared with a conventional surface boundary portion of a plurality of types of sheets in different colors, which is easy to be partially bent by pressing (inter-roll pressure) in the stacking direction, molding accuracy of the surface boundary portion is more excellent, and a commodity value can be improved when it is made into a product as an interior material for automobile such as an instrument panel.

Particularly, it is preferable that the plurality of types of second sheet layers 3', 3" in different colors are disposed side by side as the second sheet layer 3.

In this case, it becomes possible to create a skin surface in three colors or more including a color different from that of the first sheet layer 2 (first sheet layer 2 and the second sheet layer 3).

Therefore, the interior material for vehicle A having multi-color skin surface can be provided.

As a result, a degree of freedom in design is increased, and the commodity value can be improved.

Moreover, the second sheet layer 3 preferably has the second surface 3a disposed so as to protrude toward the sensor for position control S for working more than the first surface 2a, and the stepped part 31 formed from the side surface 3b of the second sheet layer 3 to the first surface 2a.

In this case, by sensing the position of the linear stepped part 31 by the sensor for position control S, position control of the laser irradiation, the working machine such as a cutter or the like to the foamed sheet layer 1, the first sheet layer 2, and the second sheet layer 3 as a whole can be executed on the basis of this position sensing.

Therefore, a forming position of the fragile part for lid cleavage G1 with respect to the foamed sheet layer 1, the first sheet layer 2, and the second sheet layer 3 as a whole can be accurately positioned.

As a result, as compared with the conventional one with a plurality of types of sheets in different colors, which does not have any step in the surface boundary portion but is substantially the same plane, the fragile part for lid cleavage G1 of the airbag G can be accurately positioned, and the fragile part for lid cleavage G1 with high accuracy can be created, which is excellent in workability.

The embodiment of the present invention has been described above, but the present invention is not limited to that. Detailed configuration may be changed as appropriate within a range of the gist of the present invention.

In the above-described embodiment, the method of forming the fragile part for lid cleavage G1 of the airbag G by the laser irradiation or the working machine such as a cutter was explained, but the present invention is not limited to that. The fragile part for lid cleavage G1 with a predetermined depth may be drilled on the rear surface side of the surface decorative layer B from the base material 4 side by a method other than the laser irradiation, a cutter or the like.

Moreover, as the sensor for position control S, a color detection sensor capable of discrimination of colors may be used to sense the stepped part 31. In this case, since the surface boundary portion of the first sheet layer 2 and the second sheet layer 3 are molded linearly by the manufacturing method of the present invention, the stepped part 31 can be sensed accurately by the color detection sensor, and the fragile part for lid cleavage G1 of the airbag G can be accurately positioned.

It is to be noted that, in the embodiment described above, the interior material for vehicle A used for forming the surface decorative layer B such as an instrument panel on which the airbag G is mounted, a pillar and a roof rail in the periphery of the door glass and the like has been explained, but this is not limiting, and the interior material for vehicle A can be used for vehicles other than automobiles. In this case, too, actions and advantages similar to those of the above-described embodiment can be obtained.

REFERENCE SIGNS LIST

A Interior material for vehicle
1 Foamed sheet layer
1a Foam surface
1b Foam rear surface
2 First sheet layer
2a First surface
2b First rear surface
21 Joined portion
22 Surface treated layer
3 Second sheet layer
3a Second surface
3b Side surface
31 Stepped part
3', 3" Second sheet layers in different colors
Y Stacking direction
P Pressing force (inter-roll pressure) in stacking direction
S Sensor for position control

What is claimed is:

1. An interior material for a vehicle in which a first sheet layer and a second sheet layer in different colors are stacked on a surface side of a foamed sheet layer and bonded together by a pressing force in a stacking direction, comprising:
the foamed sheet layer having a foam surface opposing a first rear surface of the first sheet layer;
the first sheet layer joined along the foam surface; and
the second sheet layer joined directly to a joined portion of a part of a first surface of the first sheet layer, wherein
the joined portion is formed linearly and has substantially the same width dimension as the width dimension of the second sheet layer,
the first sheet layer is made of an elastically deformable resin,
the first surface of the first sheet layer has the joined portion and a surface treated layer formed over the entire first surface excluding the joined portion, the second sheet layer is bonded along the joined portion so that a part of a side surface of the second sheet layer abuts against a layer wall of the surface treated layer,
the second sheet layer has a second surface disposed so as to protrude in the stacking direction more than the surface treated layer formed on the first surface, and a stepped part formed from the side surface of the second sheet layer to the first surface, and
the second surface of the second sheet layer and a rear surface of the foamed sheet layer further work as pressure receiving surfaces for receiving the pressing force, wherein the second sheet layer consists of a single layer in the stacking direction.

2. The interior material for a vehicle according to claim 1, wherein
a plurality of types of second sheet layers in different colors are disposed side by side as the second sheet layer.

3. The interior material for a vehicle according to claim 1, wherein the surface treated layer is not present between the second sheet layer and the joined portion of the part of the first surface of the first sheet layer.

4. A method for manufacturing an interior material for a vehicle in which a first sheet layer and a second sheet layer in different colors are stacked on a surface side of a foamed sheet layer and bonded together by a pressing force in a stacking direction, comprising:
a surface treating process of forming a surface treated layer on a first surface of the first sheet layer, over the entire first surface excluding a joined portion which has substantially the same width dimension as that of the second sheet layer and is linear;
a first stacking process of joining the second sheet layer directly to the joined portion of the first surface so that a part of a side surface of the second sheet layer abuts against a layer wall of the surface treated layer;
a second stacking process of joining a foam surface of the foamed sheet layer to a first rear surface of the first sheet layer; and
a bonding process of bonding the second sheet layer, the first sheet layer, and the foamed sheet layer by the pressing force with a second surface of the second sheet layer and a foam rear surface of the foamed sheet layer as pressure receiving surfaces, wherein
the first sheet layer is made of an elastically deformable resin, and
the second sheet layer has the second surface disposed so as to protrude in the stacking direction more than the surface treated layer formed on the first surface, and a stepped part formed from the side surface of the second sheet layer the first surface, wherein the second sheet layer consists of a single layer in the stacking direction.

* * * * *